Figure 1:
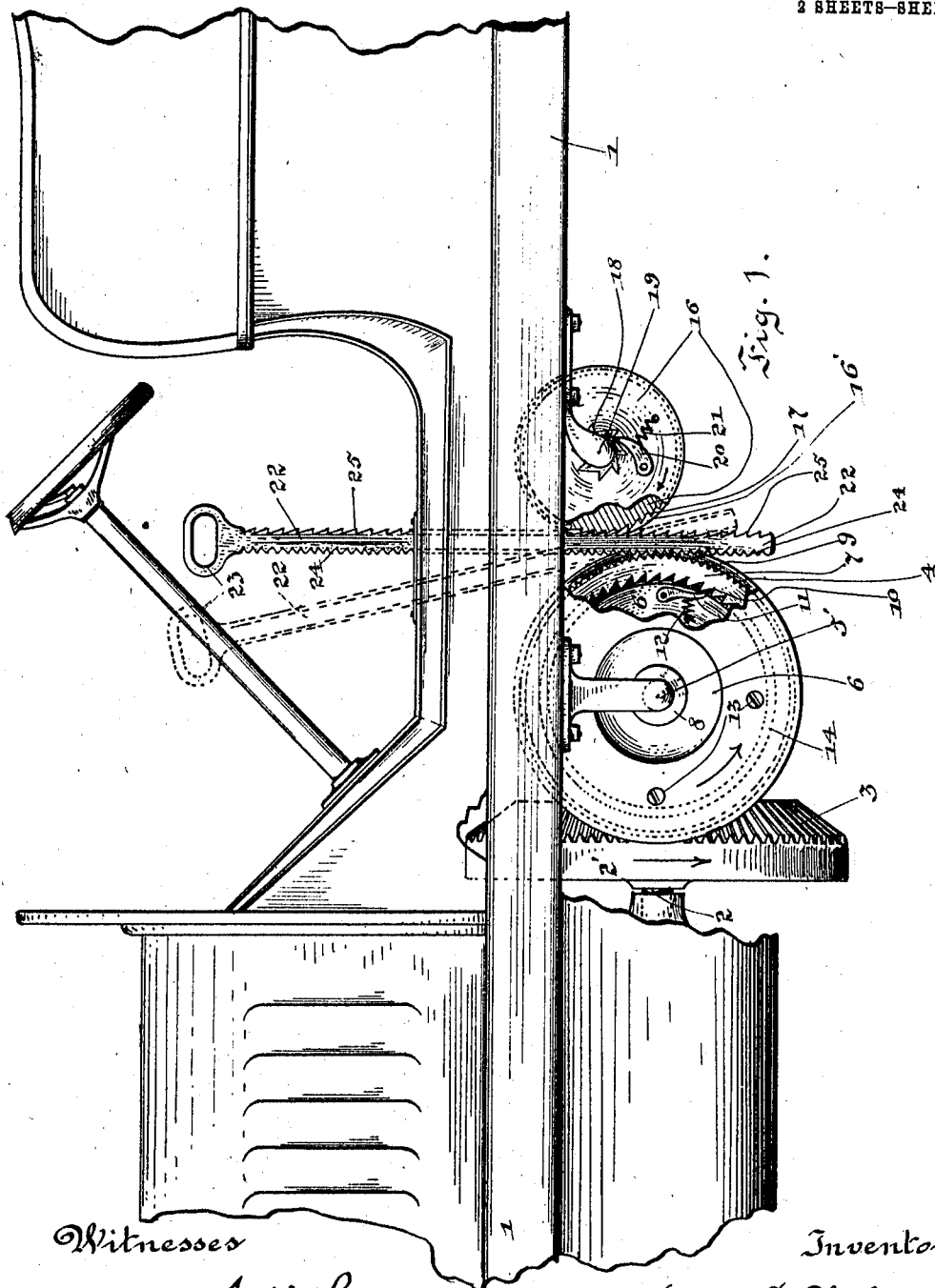

H. E. WILSON.
AUTOMOBILE ENGINE STARTER.
APPLICATION FILED MAR. 7, 1910.

978,417.

Patented Dec. 13, 1910.
2 SHEETS—SHEET 1.

Witnesses
W. C. Smith.
B. G. Richards

Inventor
Henry E. Wilson,
by Joshua R. H. Potts
his Attorney.

H. E. WILSON.
AUTOMOBILE ENGINE STARTER.
APPLICATION FILED MAR. 7, 1910.
978,417.
Patented Dec. 13, 1910.
2 SHEETS—SHEET 2.
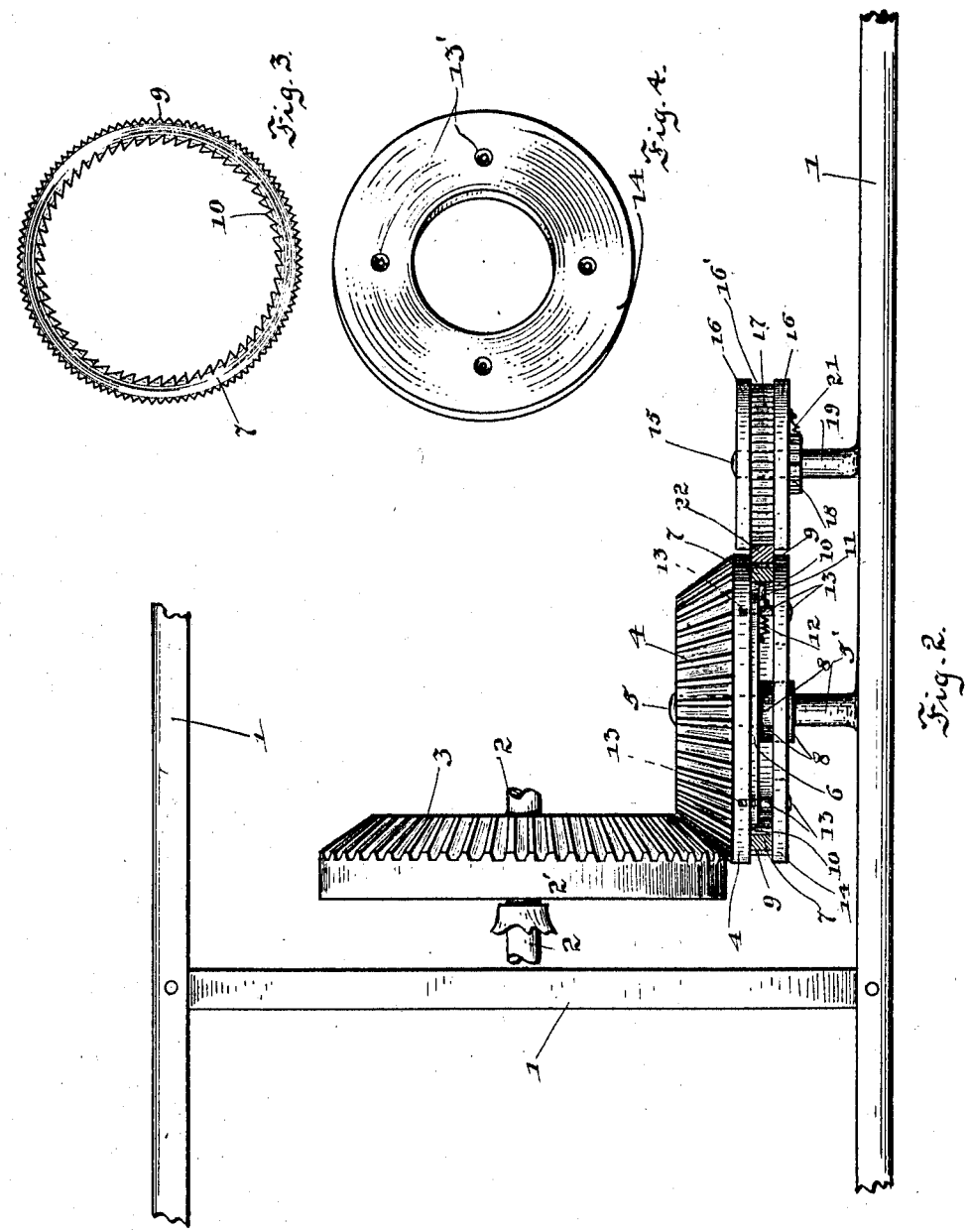
Witnesses
W. E. Smith
B. G. Richards
Inventor
Henry E. Wilson
by Joshua R. H. Potts
his Attorney.

UNITED STATES PATENT OFFICE.

HENRY E. WILSON, OF CHICAGO, ILLINOIS, ASSIGNOR OF ONE-FOURTH TO RALPH W. McKINNEY, OF CHICAGO, ILLINOIS.

AUTOMOBILE ENGINE-STARTER.

978,417.

Specification of Letters Patent.

Patented Dec. 13, 1910.

Application filed March 7, 1910. Serial No. 547,705.

*To all whom it may concern:*

Be it known that I, HENRY E. WILSON, a subject of the King of England, residing at Chicago, county of Cook, and State of Illinois, have invented certain new and useful Improvements in Automobile Engine-Starters, of which the following is a specification.

My invention relates to improvements in automobile engine starters and has for its object the production of a device of this character which may be operated from the seat of the automobile and which shall have means incorporated therein for preventing injury to the operator in the event of premature firing of a cylinder charge in the motor.

A further object of my invention is to provide a starting device which shall possess a minimum number of parts, and be inexpensive of manufacture and efficient in operation.

Other objects will appear hereinafter.

With these objects in view my invention consists in the novel construction and arrangement of parts which will be hereinafter fully described and more particularly pointed out in the appended claims.

My invention will be more readily understood by reference to the accompanying drawings forming a part of this specification, and in which, Figure 1 is a side elevation of a portion of an automobile embodying my invention, parts being broken away to expose an operative mechanism, Fig. 2 is a top plan view, certain parts being shown in section, Fig. 3 is a detail side elevation, and Fig. 4 is a detail perspective view.

Referring now to the drawings, 1 designates an automobile frame and 2 the engine or power shaft arranged centrally and longitudinally in the conventional manner.

2' designates the engine fly wheel and 3 a beveled gear cut on the periphery thereof. Meshing with the beveled gear 3 is a beveled gear 4 which is rotatably mounted on the stationary journal 5 projecting inwardly from the bracket 5' and integral therewith. The side of the beveled gear 4 opposite the teeth thereof is provided with a recessed portion 6 which is concentric with said beveled gear and on which the ring 7 is loosely mounted and free to rotate as emergency requires. The stationary collar 8 is pressed into the journal 5 and is adapted to receive the thrust pressure of the beveled gear 4.

Provided in the periphery of the ring 7 are V-shaped teeth 9 and on the interior thereof are cut ratchet teeth 10, a pawl 11 pivoted to the portion 6 being in normal engagement with said ratchet teeth by means of the spring 12. Secured in position by means of the screws 13 which are screwed into the beveled gear 4 is a circular plate 14, said screws passing through screw holes 13' provided in said plate. The plate 13 is shown in detail in Fig. 4 and is provided with a large central opening for lightness of construction.

Rotatably mounted on the journal 15 is a gear wheel 16 which is provided with a periphery and groove 16', the bottom of the latter being formed into ratchet teeth 17. Arranged at one side of the gear wheel 16 is a small stationary ratchet wheel 18 which is formed integral with the journal 15 and the bracket 19, the latter being secured to the automobile frame 1 as is also the bracket 5'. A pawl 20 pivoted to the side of the gear wheel 16 is held in normal engagement with the ratchet wheel 18 by means of the spring 21, consequently said gear wheel can rotate in one direction only.

In place of the ordinary starting crank a starting bar 22 is provided, the same having a handle 23 at its upper extremity. V-shaped teeth are cut on one edge of the bar 22 and rack teeth 25 are cut on the opposite edge, the former being adapted to mesh with the teeth 9 and the latter with the teeth 17 when said bar is inserted between the ring 7 and the gear wheel 16 ready for starting the engine.

The operation is as follows: The bar 22 when inclined to the dotted line position is readily passed downwardly between the ring 7 and the gear wheel 16. When at its lowermost position the bar 22 is moved to the full line position as shown in Fig. 1 and then pulled upwardly by the operator. This causes the engine to turn over since the teeth 24 will now be in mesh with the teeth 9. When the engine starts, due to the impulse of a cylinder explosion, the portion 6 will be suddenly accelerated in its motion while ring 7 may continue to move at the same speed as the starting bar. The ratchet teeth 10 co-acting with the pawl 11 obviously permits this difference in speed. No shock is transmitted to the operator who may now withdraw the starting bar. During the upward movement of the starting bar the same is pressed constantly against the teeth 17 which causes the gear 16 to rotate in the direction indicated. In the event of back firing of the engine the starting bar will be jerked into the dotted line position, downward movement being prevented by the pawl 20 which engages the ratchet wheel 18. When the starting bar is in the dotted line position the teeth 9 and 24 are out of mesh and consequently no injury will be received by the operator, it being well known that an ordinary starting crank is apt to make a complete revolution and to strike the operator before it can be released.

While I have shown what I deem to be the preferable form of my improved engine starting device I do not wish to be limited thereto as there might be various changes and modifications made in the details of construction and arrangement of parts described, and hence I desire to avail myself of such changes and modifications as fairly fall within the spirit and scope of the appended claims.

Having described my invention what I claim as new and desire to secure by Letters Patent is:

1. In a starting device for automobiles, a power shaft, a rotatable toothed member in operative connection with said power shaft, a second rotatable toothed member mounted adjacent said first named toothed member, and a manually operated starting bar having teeth on opposite edges thereof for meshing with the teeth of said members and of a size to pass freely between said members, substantially as described.

2. In a starting device for automobiles, a power shaft, a rotatable toothed member in operative connection with said power shaft, a second rotatable toothed member adjacent and coplanar with said first named toothed member, a manually operated starting bar having teeth on the opposite edges thereof for meshing with the teeth of said members and of a size to pass freely between said members, and means for preventing said second toothed member from rotating in one direction, substantially as described.

3. In a starting device for automobiles, a power shaft, a rotatable toothed ring in operative connection with said power shaft, a rotatable toothed member coplanar with said ring, a starting bar having teeth on opposite edges thereof for meshing with the teeth of said ring and said toothed member and of a width less than the distance between the teeth of said ring and said rotatable member, and means whereby said power shaft may rotate independent of said ring, substanitally as described.

4. In a starting device for automobiles, a power shaft, a rotatable toothed ring in operative connection with said power shaft, a rotatable toothed member coplanar with said ring, a starting bar having teeth on opposite edges thereof for meshing with the teeth of said ring and said toothed member and of a width less than the distance between the teeth of said ring and said rotatable member, and a pawl and ratchet connection between said ring and said power shaft, substantially as described.

5. In a starting device for automobiles, a power shaft, a rotatable toothed member in operative connection with said power shaft, a second rotatable toothed member adjacent and coplanar with said first named toothed member, a manually operated starting bar having teeth on opposite edges thereof for meshing with the teeth of said members and of a size to pass freely between said members, and a pawl and ratchet for preventing said second toothed member from rotating in one direction, substantially as described.

In testimony whereof I have signed my name to this specification in the presence of two subscribing witnesses.

HENRY E. WILSON.

Witnesses:
JANET E. HOGAN,
JOSHUA R. H. POTTS.